Dec. 17, 1968  W. SCHÜRLE ET AL  3,416,587
CHAIN LINK FOR ANTI-SKID AND TIRE-PROTECTIVE CHAINS
Filed March 11, 1966
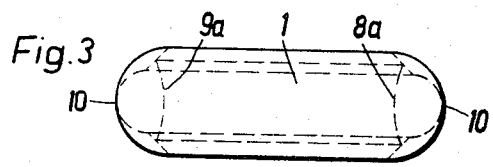
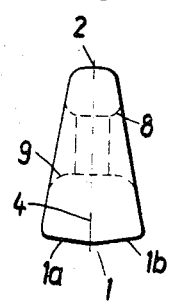
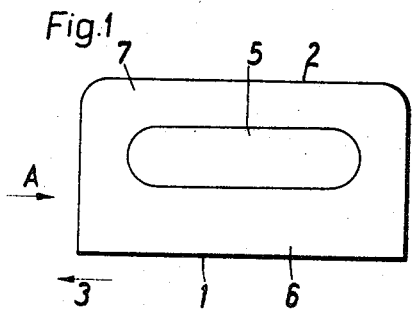
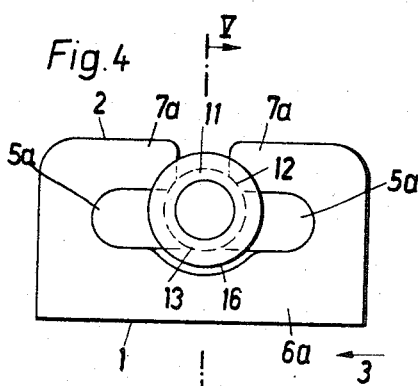
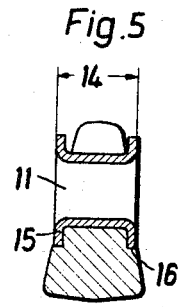
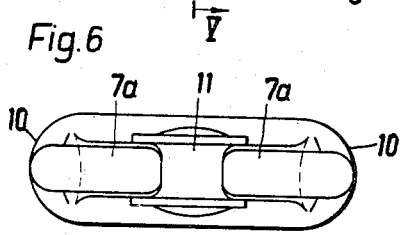
Inventors:
Werner Schürle
Anton Müller
By

United States Patent Office 3,416,587
Patented Dec. 17, 1968

3,416,587
CHAIN LINK FOR ANTI-SKID AND TIRE-PROTECTIVE CHAINS
Werner Schürle, Aalen, and Anton Müller, Unterkochen, Germany, assignors to Eisen-und Drahtwerk Erlau A.G., Aalen, Germany
Filed Mar. 11, 1966, Ser. No. 535,307
Claims priority, application Germany, July 5, 1965, E 29,642
16 Claims. (Cl. 152—243)

ABSTRACT OF THE DISCLOSURE

A chain link for an anti-skid chain structure in the form of an elongated plate-shaped member having an aperture therein for the connection of the member to other chain links which member has a road-engaging surface on one long side and a tire-engaging surface on the opposite long side, said road-engaging surface being wider and larger than the tire-engaging surface.

---

The present invention relates to a chain link for anti-skid and tire-protective chains, and in particular concerns a web member with at least one recess for receiving and suspending therein additional chain links, said web member having one side provided with a tire-engaging surface and having its other oppositely located side provided with a road-engaging surface.

Heretofore known chain links of the general type involved, especially web members, have tire-engaging and road-engaging surfaces of the same size. In most instances, the chain links are over their entire cross section of the same thickness. These chain links will under particularly hard conditions, especially in the area of the road-engaging surface, wear relatively rapidly so that their life span is greatly affected and they disengage each other eventually when the wear has advanced to the opening of the chain link. Therefore, attempts have been made by increasing the total cross section of the chain link to increase the life of the link. However, since such increase in cross section also means an increase in weight, such reinforced chain links are only to a limited extent suitable for anti-skid and tire-protective chains.

It is, therefore, an object of the present invention to provide a chain link of the above mentioned general type which will assure a relatively long life of the chain link.

It is another object of this invention to provide a chain link as set forth in the preceding paragraph which when used in connection with an anti-skid or tire-protective chain will not affect the proper function of the chain link and will not unfavorably affect the weight of the chain.

Still another object of this invention consists in the provision of a chain link as set forth above which will have high resistance against pulling, bending and pressure stresses.

These and other objects and advantages of the invention will appear more clearly from the following specification in connection with the accompanying drawings, in which:

FIG. 1 represents a side view of a chain link according to the present invention.

FIG. 2 is a view of FIG. 1 as seen in the direction of the arrow A.

FIG. 3 is a bottom view of FIG. 1.

FIG. 4 is a side view of a modified link according to the present invention.

FIG. 5 is a section along the line V—V of FIG. 4.

FIG. 6 is a top view of the link of FIG. 4.

With a chain link for anti-skid and tire-protective chains, especially with a web member having at least one opening for receiving and suspending therein additional chain links while one side of said chain link has a tire-engaging surface and the other oppositely located side of said chain link has a road-contacting surface, the road-contacting surface is in conformity with the present invention greater than the tire-engaging surface. This brings about that that range of the chain link which is subject to greater wear, namely the road-contacting surface of the chain link, is reinforced whereas the said web member due to the fact that it has a relatively weak cross section in the remaining portions thereof will not have an excessive weight. In view of the large wear surfaces and of the wear volume of the chain link within the range of the road-engaging surface, the chain link will also, after a longer period of use, still be fully functional.

Referring now to the drawing in detail, FIGS. 1 to 3 show a chain link according to the present invention which forms a web member and has its road-engaging surface 1 made approximately twice as wide as the tire-engaging surface 2. The different widths of surfaces 1 and 2 are obtained by designing the cross section of the chain link approximately trapezoidal as shown in particular in FIG. 2. In other words, the chain link diverges cross-section-wise from the tire-engaging surface to the road-engaging surface so that the cross section of the link increases from the tire-engaging surface to the road-engaging surface. When the chain link wears off from the road-engaging surface, the width of this road-engaging surface will only slightly decrease with increasing wear so that there will always be maintained a relatively large wear surface.

The road-engaging surface 1 is composed of two individual surfaces 1a, 1b arranged with regard to each other at an angle and extending in the longitudinal direction of the link as indicated by the arrow 3. The said surfaces 1a, 1b intersect each other along the longitudinal central plane 4 and when looking at FIG. 2 are inclined downwardly. In this way, the road-engaging surface has a greater area than it would have if it were parallel to the road surface. As will be seen from FIG. 1, the chain link is, in the longitudinal direction thereof, provided with an oblong hole 5 for receiving and suspending therein chain links. The oblong hole 5 is so arranged that web section 6 which includes the road-engaging surface 1 will have a greater height than web section 7 including the tire-engaging surface 2. The edges 8 and 9 of the oblong hole 5 form approximately one-fourth of a circle in cross section. The edges 8a and 9a are preferably semicircular in cross section. In this way, the suspension of chain links in the chain ling 1 according to the invention will be greatly facilitated and an easy movability of the chain links relative to each other will be assured.

As will be seen from FIG. 3, the front and rear end faces 10 of the chain link (when looking in longitudinal direction of the link as indicated by the arrow 3), are rounded semi-circularly whereby the chain link also within the range of its end faces 10 will be subjected to a relatively low wear only.

The tire-engaging surface 2 of the chain link is crowned whereby the tire provided with the chain link will be protected or, in other words, the tire equipped with a protective chain of the present invention will be subjected only to a low wear.

With regard to the embodiment illustrated in FIGS. 4 to 6, this embodiment represents a modified chain link of the invention according to which the web comprising the tire-engaging surface 2 is interrupted at approximately the longitudinal central area so that two individual web legs 7a extending in the direction toward each other are formed. The free ends of said legs 7a are spaced from each other. Between the two individual legs 7a, and between the latter and the web comprising the road-engaging surface 1 there is clamped in a hollow rivet 11 the axial direction of which extends transverse to the longitudinal direction 3 of the chain link. Hollow rivet 11 divides the oblong hole of the chain link into two separate individual holes 5a. The individual legs 7a rest by means of corresponding pitch circular-shaped surfaces 12 within the area of the top side of hollow rivet 11 against said rivet, whereas at the lower web section 6a of the chain link there is provided a corresponding pitch circular bore 13 receiving the lower range of hollow rivet 11. By means of said rivet, the individual web legs 7a are supported relative to the web 6a so that the chain link will have a high elasticity and high wear properties. In this way, it is possible later to suspend further chain links in said chain link as it may become necessary for instance during repairs or the like. The sub-division of the oblong hole by the rivet 11 limits the movability of the additional chain links suspended in the chain link within each individual hole.

The length 14 of hollow rivet 11 is less than the width of the road-engaging surface 1. Moreover, the two folded over portions 15 of hollow rivet 11 have their lower area located in corresponding lateral recesses 16 of the lower web section 6a. In other words, in this way, the hollow rivet does laterally not protrude beyond the chain link so that when assembling the chain link the riveting folded over portion or rabbet 15 of hollow rivet 11 cannot be damaged when inserting the chain link. In view of the hollow rivet, an unintended loosening of the chain links suspended in the web member will be impossible. The hollow rivet can without difficulties be hammered out and be replaced by a new hollow rivet so that the chain link or web member according to FIGS. 4 to 6 is also suitable for the repair of anti-skid and tire-protective chains at the place of application.

Advantageously, the web member according to the invention, at least within the range of the road-engaging surface, is surface hardened whereby in view of the large road-engaging surface, a relatively large hardened wear-resistant surface is obtained. In view of the low specific surface pressure exerted upon the road-engaging surface, a low wear is obtained which is further reduced by the larger volume of material provided in conformity with the present invention.

What is claimed is:

1. A chain link for an anti-skid chain structure for a vehicle tire which comprises; an elongated member in the form of a flat plate having an aperture therein for the connection of the member to other chain links, said member having a road engaging surface on one long side and a tire engaging surface on the opposite long side, said link tapering outwardly in cross section from its tire engaging side toward its road engaging side whereby said road engaging surface is wider in the lateral direction of said link than said tire engaging surface.

2. A chain link according to claim 1, in which said road engaging surface comprises two individual surfaces at an angle to each other intersecting in the central longitudinal plane of the link, said angle being such that the region of intersection of said individual surfaces protrudes toward the road side of the link.

3. A chain link according to claim 1, in which said road engaging surface is approximately twice as wide as said tire engaging surface.

4. A chain link according to claim 1, in which said link in cross section is substantially trapezoidal.

5. A chain link according to claim 1, in which said aperture is elongated in the direction of the length of said link.

6. A chain link according to claim 5, in which the edges of said aperture on opposite sides of the link are rounded so as to form quarter circles while the other edges of said aperture form semicircles.

7. A chain link according to claim 1, in which the ends of said link are semicircular in transverse cross section.

8. A chain link according to claim 1 in which said tire engaging surface is rounded toward the tire.

9. A chain link according to claim 1, in which said road engaging surface is hardened.

10. A chain link according to claim 5, in which said link has a transverse slot therein extending from the tire surface side thereof to said aperture and positioned in about the center of the length of the link.

11. A chain link according to claim 10, in which a tubular insert is disposed in said slot and extends across said aperture and divides the aperture into two end parts, the axis of said tubular insert extending transversely to the length of said link.

12. A chain link according to claim 11, in which said tubular insert is cylindrical and has an outer diameter greater than the width of said aperture so the insert is retained in the link by engagement with the bottom side of the aperture and the corners formed at the sides of said slot where it opens into said aperture.

13. A chain link according to claim 12, in which the portion of the link below said aperture is recessed on opposite sides concentrically with said insert, and flanges in the ends of said insert having the portions thereof which are co-extensive with said recesses disposed in the recesses.

14. A chain link according to claim 13, in which the length of said insert in the direction of the axis thereof is shorter than the width of said tire engaging surface.

15. A chain link according to claim 12, in which the said link on the bottom side of the aperture is recessed for receiving the adjacent wall portion of said insert.

16. A chain link in the form of an elongated plate for anti-skid and tire protective chains which has a first longitudinal surface for engagement with the ground and also has a second longitudinal surface opposite said first surface for engagement with a tire on which a chain containing the said link is to be mounted, the sidewalls of said chain link tapering from said first surface in the direction toward said second surface, said link being provided with aperture means arranged between said first and second surfaces for receiving another link.

References Cited

UNITED STATES PATENTS

| | | | |
|---|---|---|---|
| 985,884 | 3/1911 | Clark | 152—244 X |
| 1,229,613 | 6/1917 | Hodges | 152—243 |
| 1,875,268 | 8/1932 | Senglar | 152—243 |

ARTHUR L. LA POINT, *Primary Examiner.*

D. F. WORTH, *Assistant Examiner.*

U.S. Cl. X.R.

152—244